United States Patent
Kim et al.

(10) Patent No.: US 9,489,094 B2
(45) Date of Patent: Nov. 8, 2016

(54) TOUCH SENSING PANEL

(71) Applicant: SAMSUNG DISPLAY CO., LTD., Yongin, Gyeonggi-Do (KR)

(72) Inventors: Jung-Yun Kim, Cheonan-si (KR); Sung Ku Kang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 78 days.

(21) Appl. No.: 14/462,479

(22) Filed: Aug. 18, 2014

(65) Prior Publication Data
US 2015/0277635 A1   Oct. 1, 2015

(30) Foreign Application Priority Data
Mar. 28, 2014   (KR) .................. 10-2014-0037221

(51) Int. Cl.
*G06F 3/044*   (2006.01)
*G06F 3/047*   (2006.01)

(52) U.S. Cl.
CPC .............. *G06F 3/044* (2013.01); *G06F 3/047* (2013.01); *G06F 2203/04111* (2013.01)

(58) Field of Classification Search
CPC .................. G06F 3/047; G06F 3/044; G06F 2203/04111
USPC ........................................................ 345/173
See application file for complete search history.

(56) References Cited

U.S. PATENT DOCUMENTS

| | | | |
|---|---|---|---|
| 8,199,127 B2 | 6/2012 | Mamba et al. | |
| 8,400,418 B2 | 3/2013 | Matsuo | |
| 8,564,556 B2 | 10/2013 | Lee et al. | |
| 2006/0267914 A1* | 11/2006 | Chang | G02F 1/1345 345/100 |
| 2008/0278178 A1* | 11/2008 | Philipp | G06F 3/044 324/662 |
| 2009/0267916 A1* | 10/2009 | Hotelling | G06F 3/044 345/174 |
| 2010/0123866 A1* | 5/2010 | Chang | G02F 1/136286 349/141 |
| 2010/0182253 A1* | 7/2010 | Park | G06F 3/044 345/173 |
| 2012/0154302 A1 | 6/2012 | Cho et al. | |
| 2012/0182233 A1* | 7/2012 | Kim | G06F 3/044 345/173 |
| 2012/0306776 A1 | 12/2012 | Kim et al. | |
| 2013/0088448 A1 | 4/2013 | Seo et al. | |
| 2013/0342770 A1* | 12/2013 | Kim | G06F 3/044 349/12 |

(Continued)

FOREIGN PATENT DOCUMENTS

| | | |
|---|---|---|
| KR | 10-0898221 | 5/2009 |
| KR | 10-1125363 | 3/2012 |

(Continued)

*Primary Examiner* — Dmitriy Bolotin
(74) *Attorney, Agent, or Firm* — Lewis Roca Rothgerber Christie LLP

(57) ABSTRACT

A touch sensing panel includes a plurality of first touch electrodes and a plurality of second touch electrodes in a touch sensing area to sense a touch, the plurality of first touch electrodes and the plurality of second touch electrodes are separated from each other. The touch sensing panel further includes a plurality of first connectors coupling the first touch electrodes arranged in a first direction and a plurality of second connectors coupling the second touch electrodes arranged in a second direction different from the first direction, a first connecting wire between a second touch electrode of the second touch electrodes and a first touch electrode of the first touch electrodes that are adjacent to each other, the first connecting wire being coupled to the first touch electrode or the corresponding first connectors, and a shield pattern adjacent to the first connecting wire and extending along the first connecting wire.

6 Claims, 12 Drawing Sheets

(56) References Cited

U.S. PATENT DOCUMENTS

2015/0084888 A1\* 3/2015 Han ....................... G06F 3/0412
                                                      345/173
2015/0212632 A1\* 7/2015 Wang ....................... G06F 3/044
                                                      345/173
2015/0253898 A1\* 9/2015 Kim ........................ G06F 3/044
                                                      345/174

FOREIGN PATENT DOCUMENTS

| KR | 10-2012-0083692 | 7/2012 |
| KR | 10-2013-0012491 | 2/2013 |
| KR | 10-2013-0022568 | 3/2013 |
| KR | 10-1285428 | 7/2013 |

\* cited by examiner

TOUCH SENSING PANEL

CROSS-REFERENCE TO RELATED APPLICATION

This application claims priority to and the benefit of Korean Patent Application No. 10-2014-0037221, filed in the Korean Intellectual Property Office on Mar. 28, 2014, the entire disclosure of which is incorporated herein by reference.

BACKGROUND

1. Field

Aspects of embodiments of the present invention relate to a touch sensing panel, and more particularly, to a capacitive touch sensing panel.

2. Description of the Related Art

Display devices such as a liquid crystal displays (LCD), organic light emitting diode (OLED) displays, and electrophoretic displays may include a touch sensing function that can interact with an observer, in addition to an image displaying function. When a finger or a touch pen of a user approaches or contacts a screen of these display devices to write or draw pictures, the touch sensing function detects changes of pressure applied to the screen by the display device, charges, or light to acquire information regarding the approach or contact of an object to the screen or a contact position. The display device may receive an image signal and display an image based on the contact information.

The touch sensing function may be accomplished through a touch detecting sensor. The touch detecting sensor may be classified according to various schemes such as a resistive type, a capacitive type, an electro-magnetic type (EM), or an optical type.

For example, in the resistive touch detecting sensor, two electrodes facing each other with a gap therebetween may contact each other by a pressure caused by an external object. When the two electrodes contact each other, the contact position can be detected by perceiving a voltage change induced by a resistance variation at the position.

The capacitive touch detecting sensor includes a sensing capacitor with a plurality of sensing electrodes for transmitting a sensing signal, and is configured to detect a change of capacitance of the sensing capacitor or a change of an amount of charge occurring when a conductor such as a finger approaches the touch detecting sensor, and detects the touch state and the touch position. The capacitive touch detecting sensor includes a plurality of touch electrodes disposed in a touch sensing area for sensing a touch and a signal transfer wire connected to the touch electrodes. The signal transfer wire may transfer a sense input signal to the touch electrode or may transfer a sense output signal of the touch electrode generated by a touch to the signal controller.

The signal transfer wire is generally provided in a dead space that is near a touch sensing area of the touch sensing panel or a peripheral area. A number of the signal transfer wires may be increased when the touch sensing panel increases in size.

FIG. 1 shows a conventional touch sensing panel in the related art. With reference to FIG. 1, a conventional touch sensing panel 5300 will now be described in further detail.

This touch sensing panel 5300 includes a touch sensing area TA for sensing a touch and a peripheral area PA thereof.

A plurality of first touch electrodes 5410 and a plurality of second touch electrodes 5420 are formed in the touch sensing area TA. The first touch electrodes 5410 and the second touch electrodes 5420 may be alternately arranged. The first touch electrodes 5410 arranged along a row may be connected to each other through a first connector 5412, and the second touch electrodes 420 arranged along a column direction may be connected to each other through a second connector 5422.

A first touch driving wire 5411 connected to the first touch electrode 5410 and a second touch driving wire 5421 connected to the second touch electrode 5420 are provided in the peripheral area PA. The first and second touch driving wires 5411 and 5421 are connected to a pad 5450.

As shown in FIG. 1, dead spaces D1 and D2 are created on the left and the right of the touch sensing area TA because of the first touch driving wire 5411 connected to the first touch electrode 5410, thereby failing to satisfy a need of the observer who wants a narrow peripheral area. Particularly, when the touch sensing panel becomes wider, the dead spaces D1 and D2 become wider and the touch sensing area TA may appear narrower, relatively.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a touch sensing panel having an enlarged touch sensing area and a reduced dead space in which a signal transfer wire is located.

Aspects of embodiments of the present invention are directed toward a touch sensing panel configured to acquire more accurate contact information by generating uniform capacitance of a sensing capacitor between touch electrodes.

Aspects of embodiments of the present invention are directed toward a touch sensing panel capable of preventing or reducing the visibility to an observer of a density difference caused by a position of a specific pattern.

According to one or more embodiments of the present invention, a touch sensing panel includes a plurality of first touch electrodes and a plurality of second touch electrodes in a touch sensing area to sense a touch, the plurality of first touch electrodes and the plurality of second touch electrodes being separated from each other, a plurality of first connectors coupling the first touch electrodes arranged along a first direction, a plurality of second connectors coupling the second touch electrodes arranged along a second direction that is different from the first direction, a first connecting wire between a second touch electrode of the second touch electrodes and a first touch electrode of the first touch electrodes that are adjacent to each other, the first connecting wire being coupled to the first touch electrode or a corresponding first connector, and a shield pattern adjacent to the first connecting wire and extending along the first connecting wire.

The shield pattern may be between adjacent second touch electrode and the first connecting wire.

The shield pattern may be substantially parallel to the first connecting wire.

The shield pattern may be at a same layer as at a same layer as at least one of the first touch electrode and the second touch electrodes.

The shield pattern may be configured to transmit a constant voltage.

The touch sensing panel may further include a shield driving wire in a peripheral area of the touch sensing area which may be coupled to the shield pattern.

The touch sensing panel may further include a dummy pattern between the second touch electrode and the first touch electrode that are adjacent to each other. The dummy pattern may be in a region of the touch sensing panel in which the shield pattern is not provided.

The plurality of first touch electrodes may form a plurality of first touch electrode rows arranged in the second direction, and the plurality of second touch electrodes may form a plurality of second touch electrode columns arranged in the first direction. The first touch electrode rows may be greater in number than that of the second touch electrode columns.

The touch sensing panel may further include a second connecting wire and a third connecting wire between the second touch electrode and the first touch electrode that are adjacent to each other. The second connecting wire and the third connecting wire may be adjacent to each other, and the third connecting wire may be coupled to the first touch electrode or the corresponding first connector.

A first touch electrode row of the first touch electrode rows coupled to the second connecting wire may be different from a first touch electrode row of the first touch electrode rows coupled to the third connecting wire from among the plurality of first touch electrode rows.

The shield pattern may be between the second connecting wire and the third connecting wire.

The shield pattern may be at a same layer as at least one of the first touch electrode and the second touch electrode.

The shield pattern may be configured to transmit a constant voltage.

The touch sensing panel may further include a shield driving wire in a peripheral area of the touch sensing area and coupled to the shield pattern.

The touch sensing panel may further include a dummy pattern between the second touch electrodes and the first touch electrodes that are adjacent to each other. The dummy pattern may be in a region in which the shield pattern is not provided According to one or more embodiments of the present invention, a touch sensing panel includes a plurality of first touch electrodes and a plurality of second touch electrodes in a touch sensing area to sense a touch, the plurality of first touch electrodes and the plurality of second touch electrodes being separated from each other, a plurality of first connectors coupling the first touch electrodes arranged along a first direction, a plurality of second connectors coupling the second touch electrodes arranged along a second direction that is different from the first direction, a first connecting wire between a second touch electrode of the second touch electrodes and a first touch electrode of the first touch that are adjacent to each other, the first connecting wire being coupled to the first touch electrode or the corresponding first connector, and a dummy pattern adjacent to the first connecting wire and extended along the first connecting wire.

The dummy pattern may be between the second touch electrode and the first connecting wire.

The dummy pattern may be at a same layer as at least one of the first touch electrode and the second touch electrode.

According to one or more embodiments of the present invention, a touch sensing panel includes a plurality of first touch electrodes and a plurality of second touch electrodes in a touch sensing area to sense a touch, the plurality of first touch electrodes and the plurality of second touch electrodes being separated from each other, a plurality of first connectors coupling the first touch electrodes arranged along a first direction, a plurality of second connectors coupling the second touch electrodes arranged along a second direction that is different from the first direction, and a second connecting wire and a third connecting wire that are adjacent to each other and between adjacent second touch electrodes and first touch electrodes, the third connecting wire being coupled to the first touch electrode or the corresponding first connector. The plurality of first touch electrodes are arranged in a plurality of first touch electrode rows in a second direction.

The plurality of second touch electrodes form a plurality of second touch electrode columns arranged along the first direction. The first touch electrode rows is greater in number than that of the second touch electrode columns.

A first touch electrode row of the first touch electrode rows coupled to the second connecting wire may be different from a first touch electrode row of the first touch electrode rows coupled to the third connecting wire from among the plurality of first touch electrode rows.

According to embodiments of the present invention, a touch sensing area of the touch sensing panel is relatively enlarged by reducing a dead space in which the signal transfer wire is located.

Also, more accurate contact information regarding an object, including a finger or writing tool approaching or contacting the touch sensing panel, can be acquired by generating uniform capacitance of the sensing capacitor between the touch electrodes, according to embodiments of the present invention.

Moreover, visibility to an observer of a density difference caused by a position of a specific pattern may be reduced or prevented, according to embodiments of the present invention.

DETAILED DESCRIPTION

Figure 1:
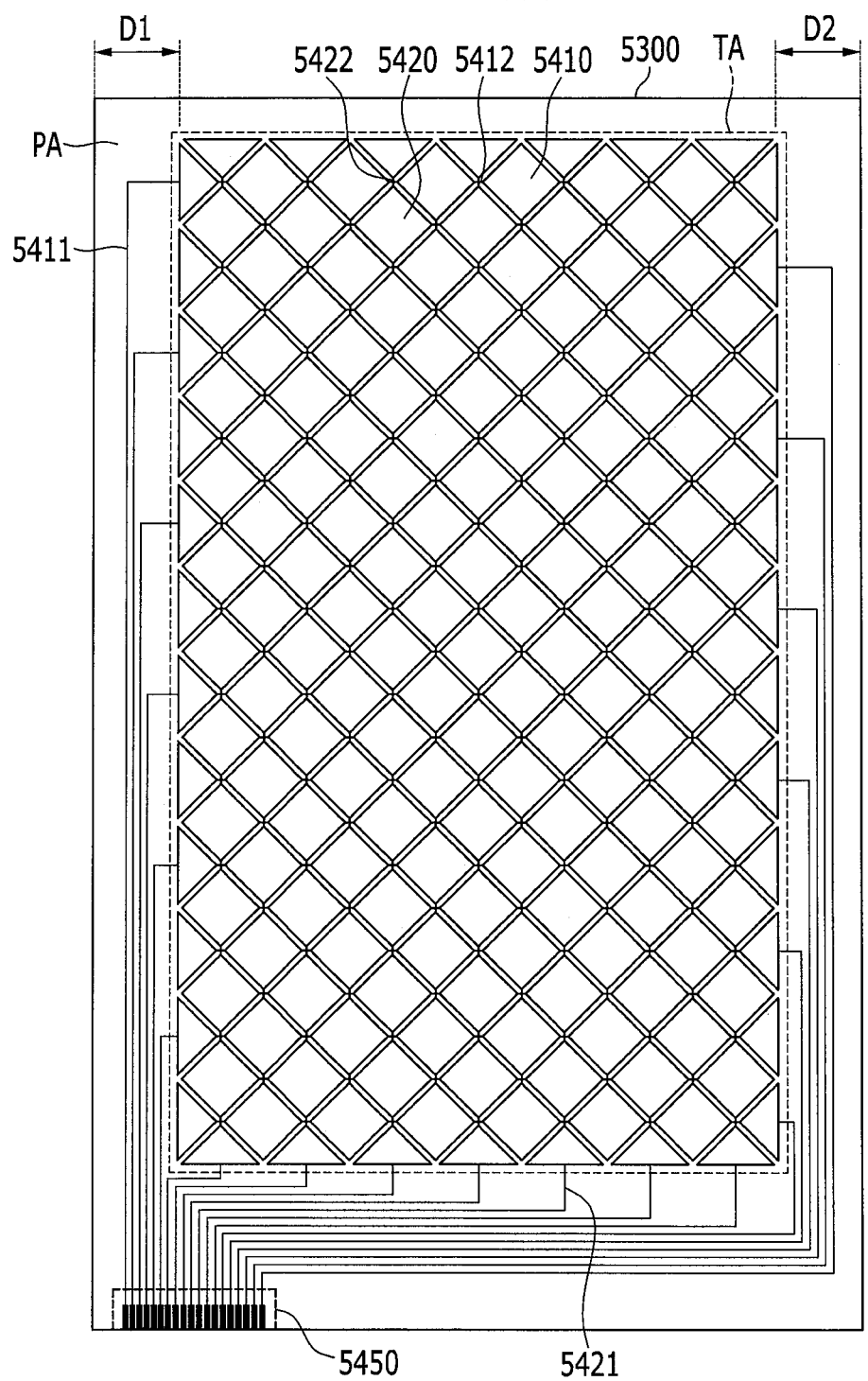
FIG. 1 is a top plan view of a touch electrode and a signal transfer wire of a touch sensing panel in the related art.

Aspects of embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Expressions such as "at least one of," when preceding a list of elements, modify the entire list of elements and do not modify the individual elements of the list. Further, the use of "may" when describing embodiments of the present invention refers to "one or more embodiments of the present invention." When a first element is described as being "coupled" or "connected" to a second element, the first element may be directly "coupled" or "connected" to the second element, or one or more other intervening elements may be located between the first element and the second element. Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

A touch sensing panel and a display device including the same, according to embodiments of the present invention, will now be described with reference to FIG. 2 and FIG. 3.

Figure 2:
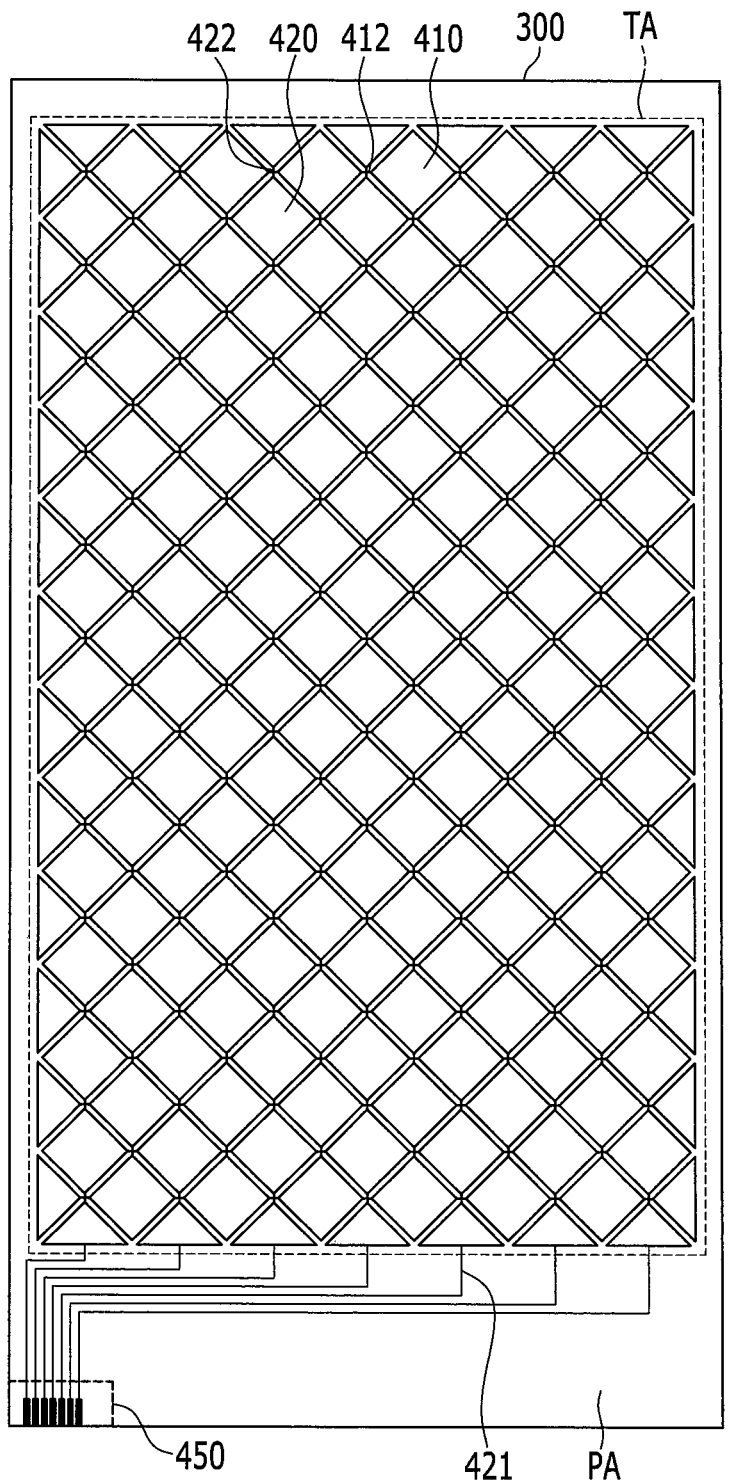
FIG. 2 is a top plan view of a touch electrode and a signal transfer wire of a touch sensing panel according to an embodiment of the present invention.

FIG. 2 is a top plan view of a touch electrode and a signal transfer wire of a touch sensing panel according to an embodiment of the present invention.

Referring to the embodiment illustrated in FIG. 2, the touch sensing panel 300 includes a touch sensing area TA and a peripheral area PA near the touch sensing area TA.

The touch sensing area TA is a region in which a touch may be sensed when an object approaches the touch sensing panel 300 or contacts the touch sensing panel 300. In this embodiment, the contact may include an external object such as a hand of a user directly touching the touch sensing panel 300 or an external object approaching the touch sensing panel 300 or hovering over while approaching the touch sensing panel 300.

In an embodiment, at least a portion of the peripheral area PA may sense a touch.

Referring to the embodiment illustrated in FIG. 2, the touch sensing area TA may include a plurality of touch electrodes. The plurality of touch electrodes may include a plurality of first touch electrodes 410 and a plurality of second touch electrodes 420.

The first touch electrodes 410, in this embodiment, are separated from the second touch electrodes 420.

A plurality of first touch electrodes 410 and a plurality of second touch electrodes 420 may be alternately dispersed at a predetermined or set interval such that the first touch electrodes 410 and the second touch electrodes 420 may not overlap each other in the touch sensing area TA. A plurality of first touch electrodes 410 may be positioned in columns and in rows, and a plurality of second touch electrodes 420 may be positioned in columns and rows.

The first touch electrodes 410 and the second touch electrodes 420 may be at a same layer.

The first touch electrodes 410 and the second touch electrodes 420 may have transmittance beyond a predetermined or set level such that light may transmit from the touch sensing panel 300. For example, the first touch electrodes 410 and the second touch electrodes 420 may be made of a thin metal layer such as indium tin oxide (ITO), indium zinc oxide (IZO), a silver nanowire (AgNw), or a transparent conductive material such as a metal mesh or carbon nanotubes (CNT), but the embodiment is not limited thereto.

The first touch electrodes 410 and the second touch electrodes 420 may each be quadrangular, and without being restricted to this, they may have various forms or shapes, such as protrusions, to improve sensitivity of the touch detecting sensor.

The first touch electrodes 410 arranged in the same row or column may be electrically connected or coupled to each other at either inside or outside the touch sensing area TA, and the second touch electrodes 420 arranged in the same row or column may be electrically connected or coupled to each other at either inside or outside the touch sensing area TA.

For example, as shown in the embodiment illustrated in FIG. 2, when the first touch electrodes 410 in the same row are connected or coupled to each other inside the touch sensing area TA, the second touch electrodes 420 in the same column may be connected or coupled to each other inside the touch sensing area TA. In this embodiment, the first touch electrodes 410 in the respective rows may be connected or coupled to each other through a first connector 412, and the second touch electrodes 420 in the respective rows may be connected or coupled to each other through a second connector 422.

Neighboring first touch electrodes 410 and second touch electrodes 420, in this embodiment, form a sensing capacitor functioning as a touch detecting sensor. The sensing capacitor may receive a sense input signal through one of the first touch electrode 410 and the second touch electrode 420, and may output a variation of an amount of charges induced by a contact as a sense output signal through the other touch electrode when there is contact by an external object.

In this embodiment, the peripheral area PA may include a second touch driving wire 421 connected or coupled to the second touch electrodes 420 connected or coupled to each other, and a pad 450 accessing the second touch driving wire 421.

The second touch driving wire 421 may include a transparent conductive material included in the first touch electrode 410 and the second touch electrode 420, or a low-resistance material such as molybdenum (Mo), silver (Ag), titanium (Ti), copper (Cu), aluminum (Ti), or molybdenum/aluminum/molybdenum (Mo/Al/Mo).

According to an embodiment of the present invention, the peripheral area PA may be on one side of the touch sensing area TA such that any dead space may not extend on other sides, for example, on the left and the right of the touch sensing area TA. In this embodiment, the pad 450 may be in the peripheral area PA that is on one side of the touch sensing area TA.

Figure 3:
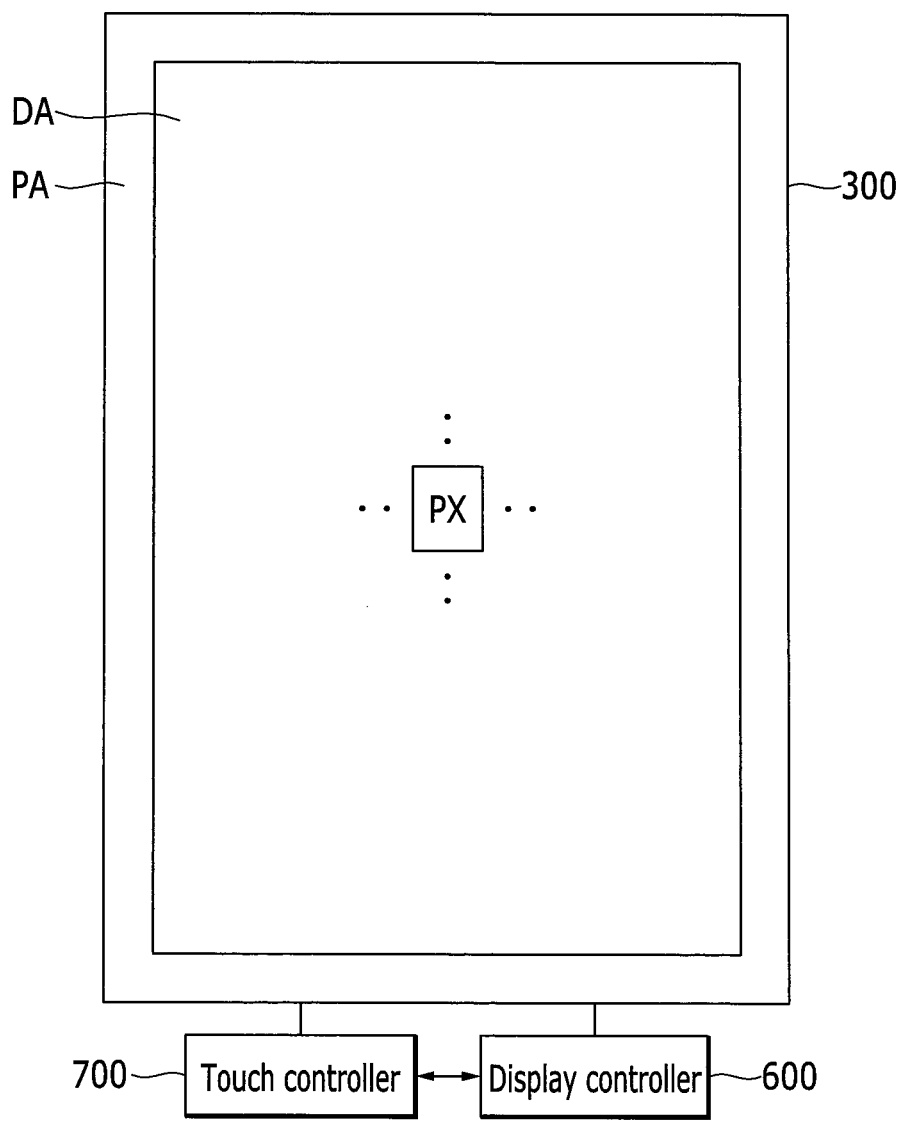
FIG. 3 is a block diagram of a display device including a touch sensing panel according to an embodiment of the present invention.

FIG. 3 is a block diagram of a display device including a touch sensing panel according to an embodiment of the present invention.

Referring to the embodiment illustrated in FIG. 3, the touch sensing panel 300 may be configured to display an image. In this embodiment, the touch sensing panel 300 includes a display area DA for displaying an image, and most of the display area DA may form the touch sensing area TA. For example, substantially all of the display area DA may be the touch sensing area TA. In another embodiment, part of the display area DA may form the touch sensing area TA.

Referring to the embodiment illustrated in FIG. 3, a plurality of pixels PX and a plurality of display signal lines connected or coupled to the pixels PX and transmitting a driving signal may be in the display area DA.

The display signal lines, in this embodiment, include a plurality of scanning signal lines for transmitting a scanning signal and a plurality of data lines for transmitting a data signal. The scanning signal lines and the data lines may cross each other and may be extended. The display signal lines may be extended to the peripheral area PA and may form a pad.

The pixels PX may be arranged in a matrix, but are not limited thereto. The respective pixels PX may include a switching element connected or coupled to the gate line and the data line, and a pixel electrode connected or coupled thereto. The switching element may be a three-terminal element such as a thin film transistor integrated with the touch sensing panel 300. The switching element may be turned on or off by the gate signal provided by the gate line, and may selectively transmit the data signal provided by the data line to the pixel electrode. The pixel PX may further include an opposed electrode facing the pixel electrode. In an embodiment where the touch sensing panel is part of an organic light emitting device, an emission layer may be between the pixel electrode and the opposed electrode and may form a light-emitting device. The opposed electrode may transmit a common voltage, in this embodiment.

In order to implement color display, each pixel may display one of the primary colors, and a desired color may be displayed by combining the primary colors. An example of the primary colors may include three primary colors or four primary colors such as red, green, blue, and the like. Each pixel may further include a color filter positioned to correspond to each pixel electrode and expressing one of the primary colors, and the emission layer included in the light emitting element embodiment may emit colored light.

The touch sensing panel 300 may be connected or coupled to a display controller 600 and a touch controller 700, and may be controlled by the display controller 600 and the touch controller 700, according to an embodiment.

In this embodiment, the display controller 600 may receive an input image signal having luminance information on the pixels PX, and an input control signal for controlling display of the input image signal from an external device. The display controller 600 may process the input image signal based on the input image signal and the input control signal, convert it into an output image signal, and generate a control signal such as a gate control signal and a data control signal. The display controller 600 may output the gate control signal to a gate driver, and may output the data control signal and the output image signal to a data driver.

The touch controller 700, in this embodiment, is connected or coupled to the first touch electrode 410 and the second touch electrode 420, and controls the touch detecting sensor. The touch controller 700 may transmit a sense input signal to the touch detecting sensor or may receive a sense output signal and process it. The touch controller 700 may process the sense output signal and may generate contact information such as a touch state and a touch position.

The touch controller 700 may be mounted on or coupled to at least one IC chip on the touch sensing panel 300, may be mounted on or coupled to a flexible printed circuit film and attached or coupled as a TCP form on the touch sensing panel 300, or may be mounted on or coupled to an additional printed circuit board (PCB). The touch controller 700 may be connected or coupled to the pad 450 of the touch sensing panel 300.

A detailed configuration of a touch sensing panel according to an embodiment of the present invention will now be described with reference to FIGS. 4 and FIG. 5 together with FIG. 2.

Figure 4:
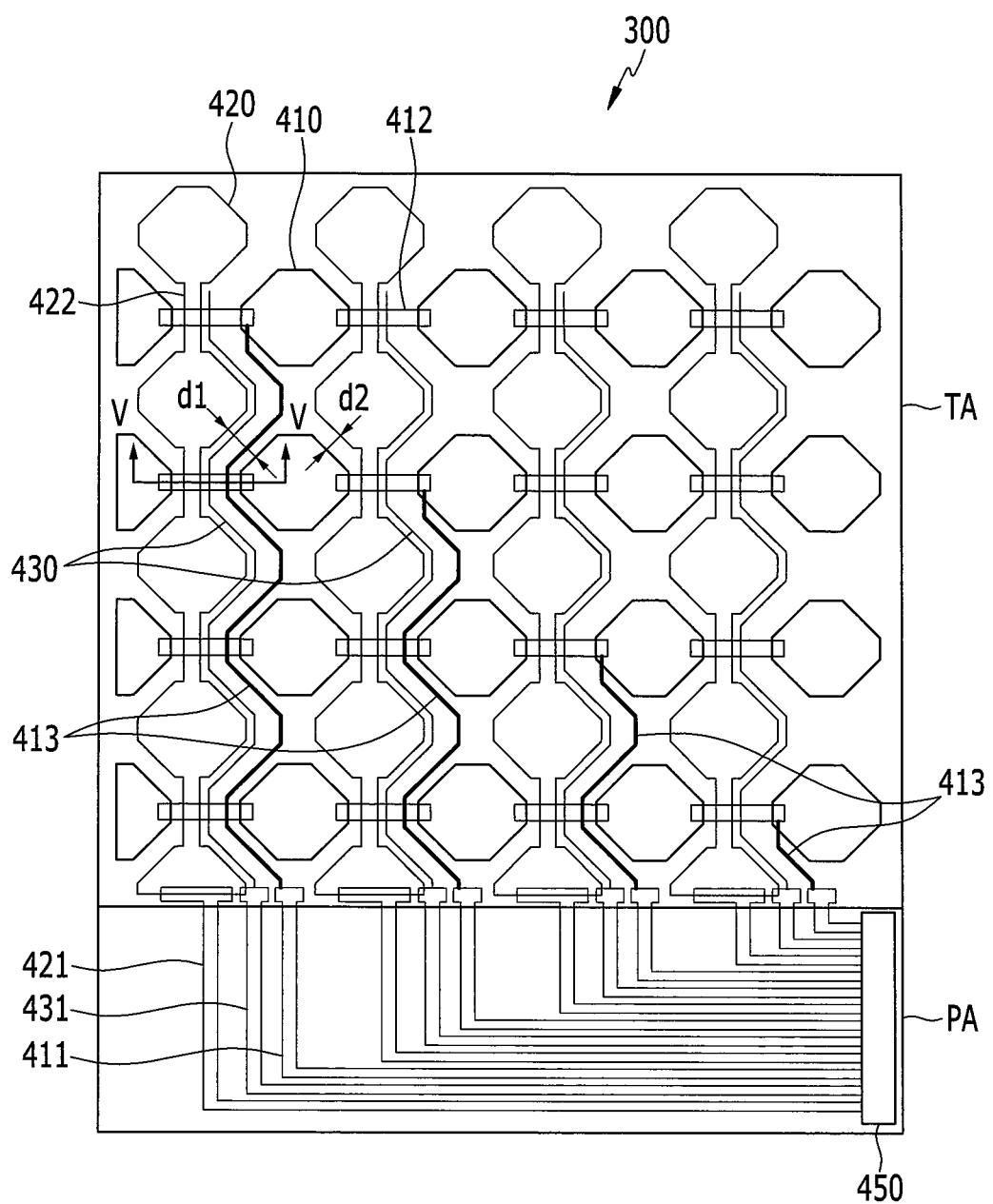
FIG. 4 is a top plan view of a touch electrode and a signal transfer wire of a touch sensing panel according to an embodiment of the present invention.
Figure 5:
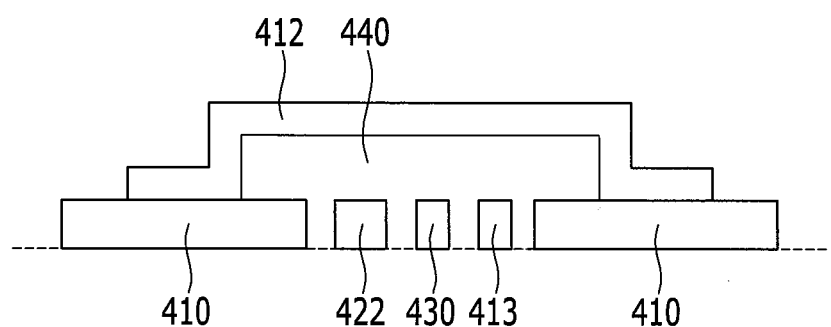
FIG. 5 is a cross-sectional view of the touch sensing panel shown in FIG. 4 at the line V-V.

FIG. 4 is a top plan view of a touch electrode and a signal transfer wire of a touch sensing panel according to an embodiment of the present invention, and FIG. 5 is a cross-sectional view of the touch sensing panel shown in FIG. 4 at the line V-V.

A plurality of first touch electrodes 410, a plurality of second touch electrodes 420, a first connector 412 for connecting or coupling neighboring first touch electrodes 410 of each row, a second connector 422 for connecting or coupling neighboring second touch electrodes 420 of each column, a connecting wire 413, and a shield pattern 430 may be in the touch sensing area TA of the touch sensing panel 300.

A first touch driving wire 411, a second touch driving wire 421, a shield driving wire 431, and a pad 450 connected or coupled to the wires may be in the peripheral area PA. The first touch driving wire 411, the second touch driving wire 421, and the shield driving wire 431 may include a transparent conductive material, and may include a low-resistance material such as molybdenum (Mo), silver (Ag), titanium (Ti), copper (Cu), aluminum (Ti), or molybdenum/aluminum/molybdenum (Mo/Al/Mo).

In an embodiment, the first touch electrode 410, the second touch electrode 420, the first connector 412, the second connector 422, the connecting wire 413, the shield pattern 430, the first touch driving wire 411, the second touch driving wire 421, the shield driving wire 431, and the pad 450 may be on a substrate, and the substrate may be transparent. For example, the substrate may include an insulating material such as glass, plastic, silicon, or synthetic resins, and may be a flexible film.

Descriptions below relating to the first touch electrode 410 and the second touch electrode 420 correspond to descriptions previously provided above, so no additional detailed description will be provided.

The second connector 422 may be at a same layer as the second touch electrode 420, and may be formed with a same material as the second touch electrode 420. In this embodiment, the second touch electrode 420 and the second connector 422 may be integrated with each other and may be simultaneously or integrally formed during a manufacturing process.

The first connector 412 may be on a layer that is different from that of the first touch electrode 410. In this embodiment, the first touch electrode 410 and the first connector 412 may be separately formed during the manufacturing process. The first touch electrode 410 may be electrically connected or coupled to the first connector 412 through direct contact, in an embodiment.

An insulating layer 440 is between the first connector 412 and the second connector 422 to insulate the first connector 412 from the second connector 422, according to an embodiment.

As shown in FIG. 5, the insulating layer 440 may be an independent "island"-shaped or isolated insulator at each crossing point of the first connector 412 and the second connector 422. The insulating layer 440 may expose at least a part of the first touch electrode 410 so that the first connector 412 may contact the first touch electrode 410.

The insulating layer 440 may have rounded corners or a polygonal shape, according to various embodiments.

According to another embodiment of the present invention, the insulating layer 440 may be entirely on the substrate, and in this embodiment, the insulating layer 440 on a part of the first touch electrode 410 may be partially removed for a connection or coupling between the first touch electrodes 410 through the first connector 412.

In another embodiment, the first connector 412 may be at a same layer as the first touch electrode 410 and may be integrated with the first touch electrode 410, and the second connector 422 may be on a layer that is different from that of the second touch electrode 420.

A plurality of second touch electrodes 420 arranged in a column and connected or coupled to each other may be connected or coupled to the second touch driving wire 421 and may be connected or coupled to the pad 450, according to an embodiment. The second touch electrode 420 may receive a sense input signal through the second touch driving wire 421 and the pad 450, or may output a sense output signal.

According to another embodiment of the present invention, the first touch electrode 410 may be on a layer that is different from that of the second touch electrode 420.

A first end of the connecting wire 413 may be connected or coupled to at least one of a plurality of first touch electrodes 410 connected or coupled to each other along row direction, and a second end may be connected or coupled to the first touch driving wire 411 and may be connected or coupled to the pad 450. The connecting wire 413 may transmit the sense input signal through the first touch driving wire 411 and the pad 450 to the first touch electrode 410, or may transmit the sense output signal by the first touch electrode 410 to the first touch driving wire 411.

As shown in the embodiment illustrated in FIG. 4, an end portion of the connecting wire 413 may be connected or coupled to the first touch electrode 410, or, in another embodiment, the end portion of the connecting wire 413 may be connected or coupled to the first connector 412.

The connecting wire 413 may be generally formed along a column direction. The connecting wire 413 may extend along the second touch electrode 420, the second connector 422, and the adjacent first touch electrode 410. Therefore, the connecting wire 413 may be bent to fit a space between the adjacent second touch electrode 420 and the first touch electrode 410, such that a reflection rate difference of the portion where the connecting wire 413 is located from the portion where the first touch electrode 410 and the second touch electrode 420 are located is reduced to improve visibility of the touch sensing panel 300.

The connecting wire 413 may include a transparent conductive material similar to that of the first and second touch electrodes 410 and 420 such that the image provided by a bottom surface of the substrate may be transmitted toward to an upper surface of the substrate.

Particularly, as shown in the embodiment illustrated in FIG. 5, the connecting wire 413 may be at a same layer as the first and second touch electrodes 410 and 420 and may be formed during the same manufacturing process.

According to another embodiment of the present invention, the connecting wire 413 may be on a layer that is different from that of the first and second touch electrodes 410 and 420.

Since the first touch driving wire 5411 in the left and right dead spaces D1 and D2 that are near the touch sensing area TA of the conventional touch sensing panel (as shown in FIG. 1) may be replaced with the connecting wire 413 according to an embodiment of the present invention, the left and right dead spaces D1 and D2 in the related art touch sensing panel may be removed according to this embodiment. Therefore, the touch sensing area TA may be further enlarged in a relative manner to satisfy the demand of a narrower or slimmer peripheral area, according to embodiments of the present invention. Particularly, a non-touch region in which touch is not sensed may be further reduced in these embodiments since the peripheral areas on the left and the right of the touch sensing area TA do not need to be enlarged when the touch sensing panel 300 is enlarged.

The shield pattern 430 may be between an adjacent first touch electrode 410 and second touch electrode 420. In this embodiment, the shield pattern 430 may extended between the second touch electrode 420 along one column, the second connector 422, and the adjacent connecting wire 413. Accordingly, the shield pattern 430 may be arranged along a column, and may be bent in the shape of the space between an adjacent second touch electrode 420, the second connector 422, and the connecting wire 413. The shield pattern 430 may be extended substantially parallel with the connecting wire 413.

As shown in the embodiment illustrated in FIG. 4, the plurality of shield patterns 430 may have a constant length. In this embodiment, the shield pattern 430 may extend near the second touch electrode 420 and the second connector 422 that are in one column in the region in which the connecting wire 413 does not extend. However, in an embodiment, the shield pattern 430 may be between the second touch electrode 420 and the second connector 422 in one column and the adjacent connecting wire 413.

The shield pattern 430 may be connected or coupled to the shield driving wire 431 of the peripheral area PA, and may be connected or coupled to the pad 450. The shield driving wire 431 may transmit a constant voltage such as a ground voltage to the shield pattern 430.

The shield pattern 430, according to an embodiment, may include a transparent conductive material similar to that of the first and second touch electrodes 410 and 420 such that the image provided by the bottom surface of the substrate may be transmitted toward to an upper surface. Particularly, as shown in FIG. 5, the shield pattern 430 may be at a same layer as the first and second touch electrodes 410 and 420 and may be formed during the same process. In an embodiment, the shield pattern 430 may be formed during an additional process.

According to an embodiment of the present invention, the connecting wire 413 connected or coupled to the first touch electrode 410 extends between the second touch electrode 420 and the second connector 422 in the touch sensing area TA and along one column and the adjacent first touch electrode 410. When a gap d1 between the first touch electrode 410 and the second touch electrode 420 that are adjacent with the connecting wire 413 therebetween, and a gap d2 between the first touch electrode 410 and the second touch electrode 420 that are adjacent without the connecting wire 413 therebetween are substantially constant. Also, the capacitance of the sensing capacitor between the connecting wire 413 and the adjacent second touch electrode 420 or the second connector 422 in a portion where the connecting wire 413 is positioned may be greater than the capacitance of the sensing capacitor between the first touch electrode 410 and the adjacent second touch electrode 420 or the second connector 422 in a portion where the connecting wire 413. Here, non-uniformity of capacitance of the sensing capacitor may be generated in the touch sensing area TA such that an error may occur in contact information.

However, when a shield pattern 430 is disposed among the connecting wire 413, the second touch electrode 420, and the second connector 422 in a like manner of an embodiment of the present invention, part of an electric field occurring between the connecting wire 413 and the second touch electrode 420 or the second connector 422 is absorbed into the shield pattern 430 and capacitance of the sensing capacitor formed between the connecting wire 413 and the adjacent second touch electrode 420 or the second connector 422 may be reduced. Accordingly, capacitance of the sensing capacitor formed between the connecting wire 413, the second touch electrode 420, and the second connector 422 may be controlled to be close to capacitance of the sensing capacitor formed between the first touch electrode 410 and the second touch electrode 420 or the second connector 422 in a portion where the connecting wire 413 is not provided. The capacitance of the sensing capacitor between the first touch electrode 410 or the connecting wire 413 connected or coupled thereto and the second touch electrode 420 in the touch sensing area TA may be substantially uniform, and contact information may be acquired.

Also, when a sense input signal or a sense output signal is input to the connecting wire 413 substantially extending in the column direction, a shield pattern 430 may intercept an influence to the adjacent second touch electrode 420 or the second connector 422 and an operational error by the touch detecting sensor, and inaccurate contact information may be reduced.

It has been described in the present exemplary embodiment that the first touch electrode 410, the second touch electrode 420, the second connector 422, the connecting wire 413, and the shield pattern 430 are provided at the same layer of the substrate, and without being restricted to this, at least some of them may be provided on a different layer. In any case, the connecting wire 413 and the shield pattern 430 may be insulated from the first connector 412 and may be extended to cross the same.

Further, the gap d1 between the first touch electrode 410 and the second touch electrode 420 that are adjacent to each other with the connecting wire 413 therebetween and the gap d2 between the first touch electrode 410 and the second touch electrode 420 that are adjacent to each other without the connecting wire 413 therebetween may be equal to or different from each other.

A touch sensing panel according to an exemplary embodiment of the present invention will now be described with reference to FIG. 6 and FIG. 7 together with the above-described drawings. Same constituent elements as the above-described exemplary embodiment will have same reference numerals and same descriptions will be omitted.

Figure 6:
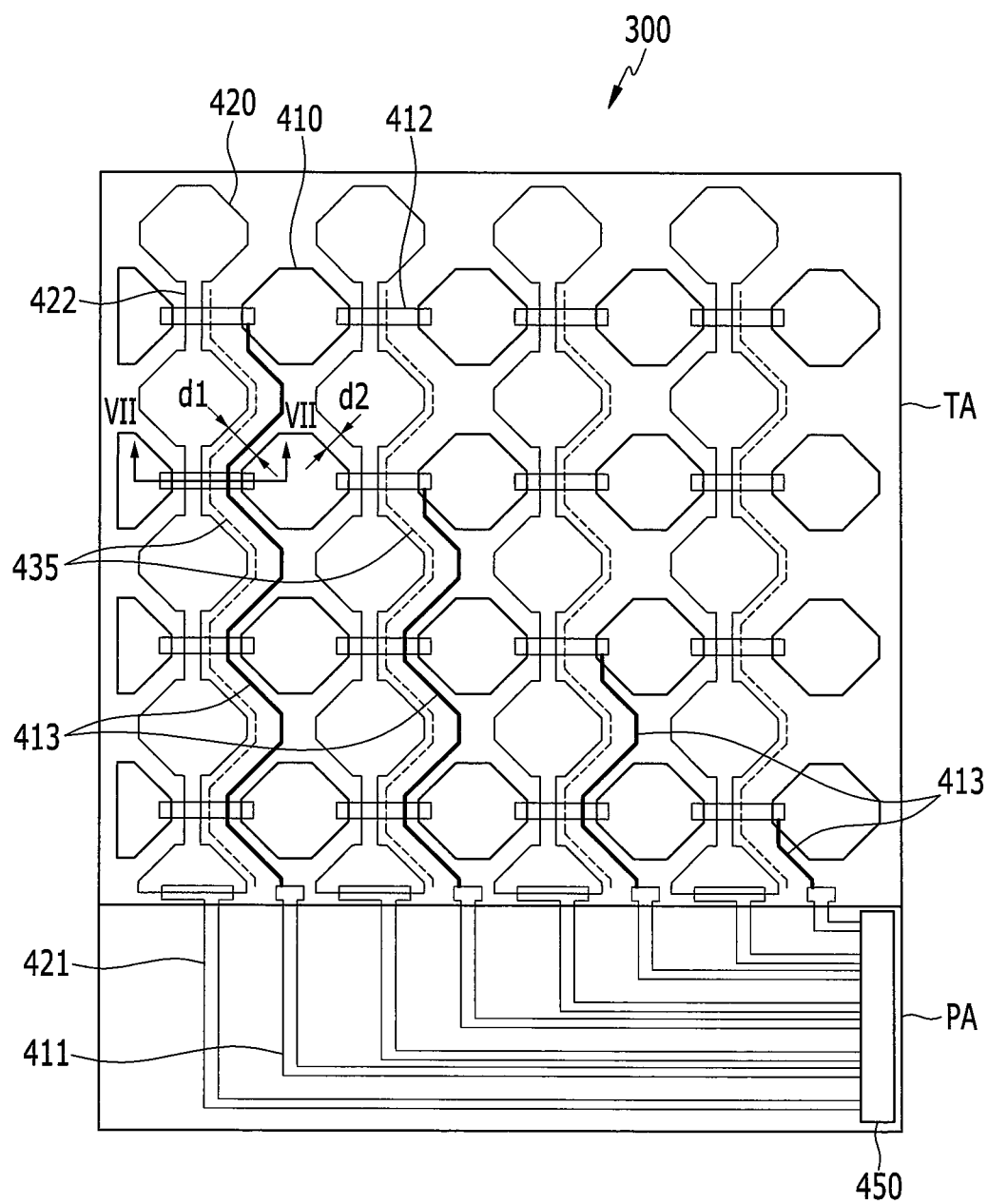
FIG. 6 is a top plan view of a touch electrode and a signal transfer wire of a touch sensing panel according to an embodiment of the present invention.
Figure 7:
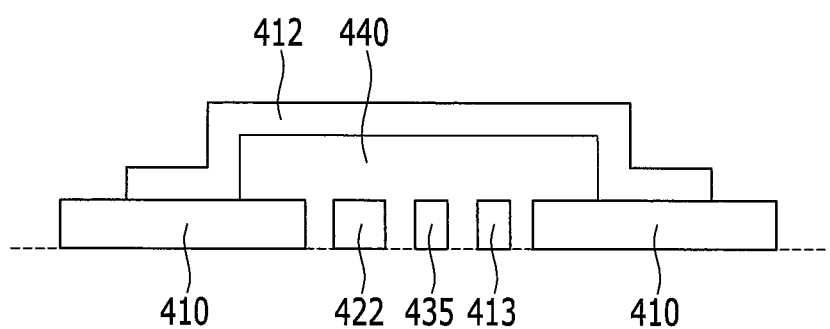
FIG. 7 is a cross-sectional view of the touch sensing panel shown in FIG. 6 at the line VII-VII.

FIG. 6 is a top plan view of a touch electrode and a signal transfer wire of a touch sensing panel according to an embodiment of the present invention, and FIG. 7 is a cross-sectional view of the touch sensing panel shown in FIG. 6 at the line VII-VII.

The touch sensing panel 300 according to this embodiment corresponds to the touch sensing panel 300 according to the embodiment shown in FIGS. 4 and 5, and may not include the shield pattern 430 and the shield driving wire 431. Hence, deterioration of capacitance of the sensing capacitor of the touch sensing panel 300 caused by absorption of the electric field by the shield pattern 430 may be reduced, in this embodiment.

In the embodiment shown in FIG. 6, a gap d1 between an adjacent first touch electrode 410 and second touch electrode 420 with the connecting wire 413 therebetween may be greater than a gap d2 between an adjacent first touch electrode 410 and second touch electrode 420 without the connecting wire 413.

Accordingly, the distance d1 between the connecting wire 413 and the adjacent second touch electrode 420 or the second connector 422 may be substantially similar to the distance d2 between the first touch electrode 410 and the second touch electrode 420 or the second connector 422 in the portion where the connecting wire 413 is not provided. The capacitance of the sensing capacitor between the connecting wire 413 and the adjacent second touch electrode 420 or the second connector 422 may be controlled or controlled to be similar to the capacitance of the sensing capacitor between the first touch electrode 410 and the second touch electrode 420 or the second connector 422 in the portion where the connecting wire 413 is not provided. Therefore, the capacitance of the sensing capacitor between the first touch electrode 410 or the connecting wire 413 connected or coupled thereto and the second touch electrode 420 in the touch sensing area TA may be set to be substantially uniform.

Referring to the embodiment illustrated in FIG. 6, the touch sensing panel 300 may further include a dummy pattern 435.

The dummy pattern 435 may extend between the connecting wire 413 and the adjacent second touch electrode 420 or the second connector 422 in one column. The dummy pattern 435 may be separated from the adjacent connecting wire 413 with a predetermined or set interval therebetween and may substantially extend in the direction of the columns. The dummy pattern 435 may be bent along the shape of the space between the second touch electrode 420 and the adjacent first touch electrode 410 similarly to the connecting wire 413.

According to an embodiment, a plurality of dummy patterns 435 may have a substantially constant length, as shown in FIG. 6. In this embodiment, the dummy pattern 435 may extend to be near the second touch electrode 420 and the second connector 422 that are in one column in the region in which there is no connecting wire 413. However, in another embodiment, the dummy pattern 435 may be between the second touch electrode 420 and the second connector 422 in one column and the connecting wire 413 extended to be adjacent to the second touch electrode 420 and/or the second connector 422.

In an embodiment, the dummy pattern 435 may not be connected or coupled to the pad 450 and may float in the touch sensing area TA.

The dummy pattern 435 may include a transparent conductive material similar to the first and second touch electrodes 410 and 420. Particularly, as shown in the embodiment illustrated in FIG. 7, the dummy pattern 435 may be in the same layer as the first and second touch electrodes 410 and 420 and may be formed during the same process. In this embodiment, manufacturing the dummy pattern 435 may not require additional process.

According to an embodiment of the present invention, when the distance d1 between the first touch electrode 410 and the second touch electrode 420 or the second connector 422 is relatively large where the connecting wire 413 is located, the dummy pattern 435 may be positioned in the space to prevent an empty space from being visible to the observer. Therefore, visibility of the touch sensing panel 300 in this embodiment may be improved.

In addition, part of the electric field between the connecting wire 413 and the second touch electrode 420 or the second connector 422 may be absorbed into the dummy pattern 435, and the capacitance of the sensing capacitor between the connecting wire 413 and the adjacent second touch electrode 420 or the second connector 422 may be reduced, in an, embodiment. Accordingly, the capacitance of the sensing capacitor between the connecting wire 413 and the second touch electrode 420 and the second connector 422 may be controlled to be similar to the capacitance of the sensing capacitor between the first touch electrode 410 and the second touch electrode 420 or the second connector 422 in the portion where there is no connecting wire 413. The capacitance of the sensing capacitor between the first touch electrode 410 or the connecting wire 413 connected or coupled thereto and the second touch electrode 420 in the touch sensing area TA may be controlled to be substantially uniform, according to this embodiment.

A touch sensing panel according to an embodiment of the present invention will now be described with reference to the embodiment illustrated in FIG. 8 in view of the above-described drawings.

Figure 8:
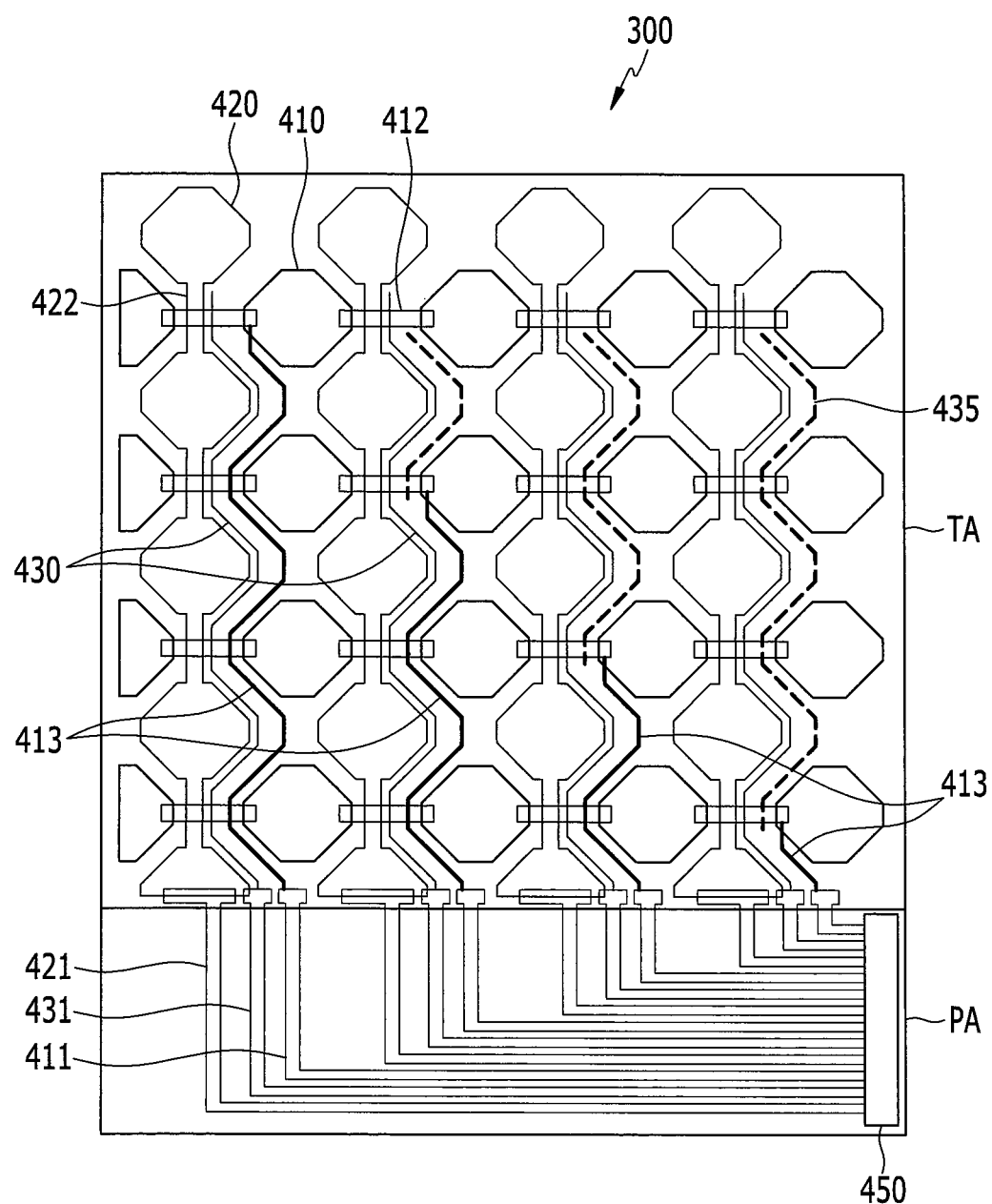
FIG. 8, FIG. 9, FIG. 10, FIG. 11, and FIG. 12 are each top plan views of a touch electrode and a signal transfer wire of a touch sensing panel according to respective embodiments of the present invention.

FIG. 8 is a top plan view of a touch electrode and a signal transfer wire of a touch sensing panel according to an embodiment of the present invention.

The touch sensing panel 300 according to this embodiment corresponds to the touch sensing panel 300 according to the embodiment shown in FIGS. 4 and 5, and may further include a dummy pattern 435.

The dummy pattern 435 according to this embodiment corresponds to the dummy pattern 435 according to the embodiment shown in FIGS. 6 and 7, and may be located or positioned where no connecting wire 413 is provided.

The dummy pattern 435 may extend between the shield pattern 430 and the adjacent first touch electrode 410 where no connecting wire 413 is provided. A first end of the dummy pattern 435 may be separated from the connecting wire 413 with a predetermined or set gap at a portion adjacent to the connecting wire 413.

According to this embodiment, a pattern density difference between the where there is no connecting wire 413 and the portion where the connecting wire 413 is may be compensated by the dummy pattern 435, and, thus, the density difference between the portion where the connecting wire 413 is and the portion where there is no connecting wire 413 may not be easily visible by to an observer.

A detailed configuration of a touch sensing panel according to an embodiment of the present invention will now be described with reference to FIG. 9, FIG. 10, FIG. 11, and FIG. 12 together with the above-described drawings.

FIG. 9, FIG. 10, FIG. 11, and FIG. 12 are each top plan views of a touch electrode and a signal transfer wire of a touch sensing panel according to respective embodiments of the present invention.

Figure 9:
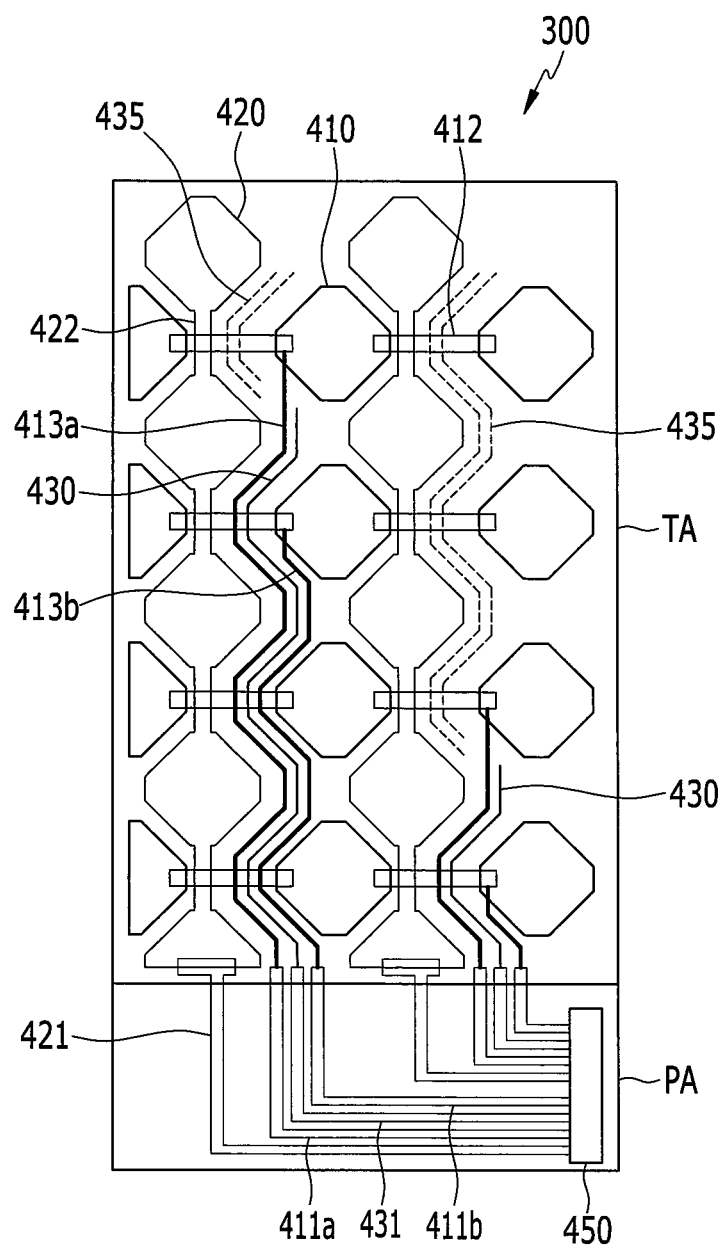

Referring to FIG. 9, the touch sensing panel 300 according to an embodiment of the present invention corresponds to the touch sensing panel 300 according to the embodiment shown in FIGS. 4 and 5, however a number of rows of the first touch electrode 410 may be greater than a number of columns of the second touch electrode 420, in this embodiment.

In this embodiment, at least two connecting wires 413a and 413b may be sequentially and adjacently disposed to the second touch electrode 420 and the second connector 422 in one column. Thus, in this embodiment, at least two connecting wires 413a and 413b may be in the space between the second touch electrode 420 and the second connector 422 in one column and the adjacent first touch electrode 410. FIG. 9 shows a pair of connecting wires 413a and 413b, and without being restricted to this embodiment, a number of the connecting wires 413a and 413b corresponding to the second touch electrode 420 and the second connector 422 in one column depending on an aspect ratio of the touch sensing panel 300 may be varied.

The first and second connecting wires 413a and 413b may be bent to fit within the space between the adjacent second touch electrode 420 and the first touch electrode 410.

A first end of the first connecting wire 413a may be connected or coupled to at least one of a plurality of first touch electrodes 410 disposed along one row, and a second end may be connected or coupled to a first touch driving wire 411a in the peripheral area PA and may also be connected or coupled to the pad 450. Similarly, a first end of the second connecting wire 413b may be connected or coupled to at least one of a plurality of first touch electrodes 410 below the row of the first touch electrode 410 connected or coupled to the first connecting wire 413a, and a second end may be connected or coupled to a second touch driving wire 411b in the peripheral area PA and may also be connected or coupled to the pad 450.

The first and second connecting wires 413a and 413b may transmit a sense input signal provided through the first touch driving wires 411a and 411b and the pad 450 to the first touch electrode 410, or may transmit a sense output signal provided by the first touch electrode 410 to the first touch driving wires 411a and 411b, according to this embodiment.

The first and second connecting wires 413a and 413b may be substantially positioned along the column direction. A length of the first connecting wire 413a may be different from that of the second connecting wire 413b.

Referring to the embodiment illustrated in FIG. 9, a shield pattern 430 may be between the adjacent first and second connecting wires 413a and 413b. The shield pattern 430 may extend in the direction of the columns, and may be bent to be accommodated in the space between the adjacent first and second connecting wires 413a and 413b The shield pattern 430 may be connected or coupled to the shield driving wire 431 in the peripheral area PA and may be connected or coupled to the pad 450. The shield driving wire 431, in this embodiment, may transmit a constant voltage such as the ground voltage.

In an embodiment where the shield pattern 430 is between the adjacent first and second connecting wires 413a and 413b, applying influence of a signal, which may be transmitted when the electric field is absorbed into the shield pattern 430, to another wire may be reduced or minimized when the sense input signal or the sense output signal is transmitted to one of the first and second connecting wires 413a and 413b. Thus, according to this embodiment, capacitance of a parasitic capacitor formed between the adjacent first and second connecting wires 413a and 413b may be reduced or minimized.

According to another embodiment of the present invention, the shield pattern 430 may be removed and a dummy pattern may be in its place. The dummy pattern, in an embodiment, may be floated. In this embodiment, a gap between the first connecting wire 413a and the second connecting wire 413b may be widened, if necessary.

Figure 10:
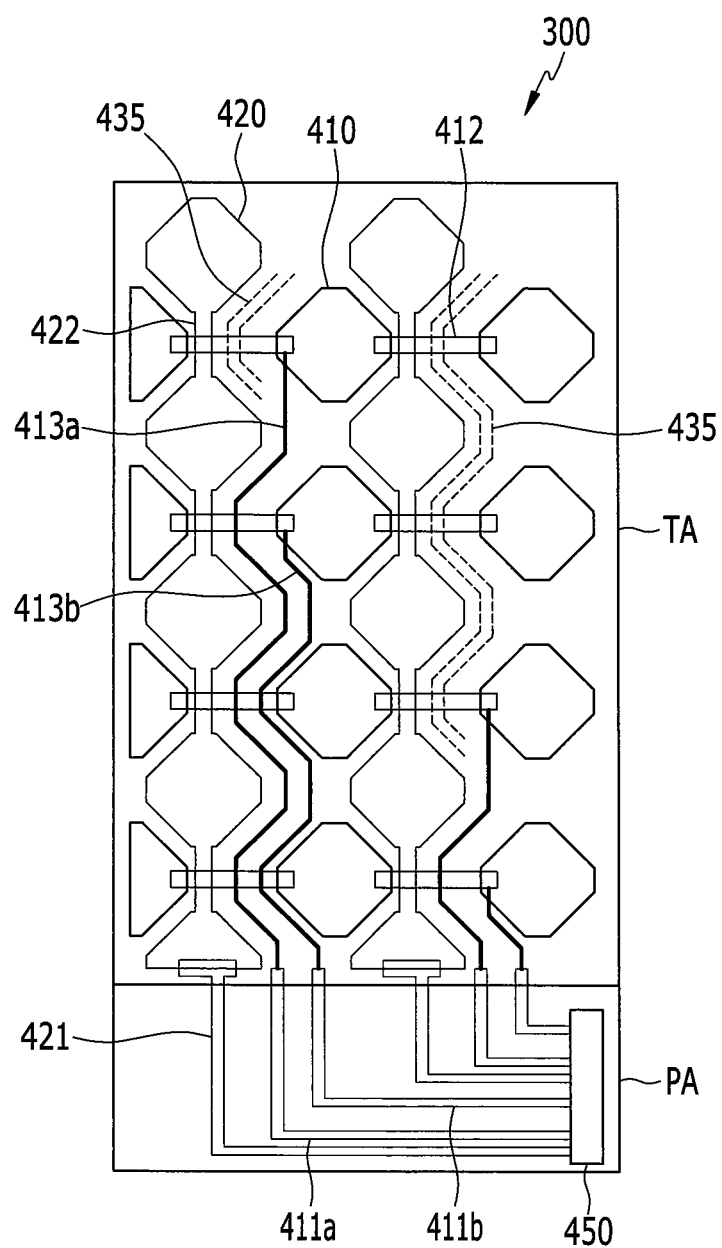

Referring to the embodiment illustrated in FIG. 10, the touch sensing panel 300 corresponds to the touch sensing panel 300 according to the embodiment shown in FIG. 9, except that the touch sensing panel 300 shown in FIG. 10 may exclude the shield pattern 430 and the shield driving wire 431. Therefore, deterioration of capacitance of the sensing capacitor of the touch sensing panel 300 caused by absorption of the electric field by the shield pattern 430 may be reduced, according to this embodiment.

In this embodiment, capacitance of the parasitic capacitor between the adjacent first and second connecting wires 413a and 413b may be reduced by increasing a gap between the adjacent first and second connecting wires 413a and 413b.

Referring to FIG. 10, the touch sensing panel 300 according to this embodiment of the present invention may further include a dummy pattern 435.

The dummy pattern 435 may be at a portion where the first and second connecting wires 413a and 413b are not. Thus, the dummy pattern 435 may extend between the first touch electrode 410 and the second touch electrode 420 in the portion of the touch sensing panel 300 where the first and second connecting wires 413a and 413b do not extend. A first end of the dummy pattern 435 may be separated from the first and second connecting wires 413a and 413b with a predetermined or set gap at the portion that is adjacent to the first and second connecting wires 413a and 413b.

According to this embodiment, the pattern density difference between the portion where no first and second connecting wires 413a and 413b are provided and the portion where the first and second connecting wires 413a and 413b are provided is compensated by the dummy pattern 435, and the density difference between the portion where the first and second connecting wires 413a and 413b are provided and the portion where they are not provided may not be easily visible to the observer.

According to another embodiment of the present invention, the dummy pattern 435 may be omitted.

Figure 11:
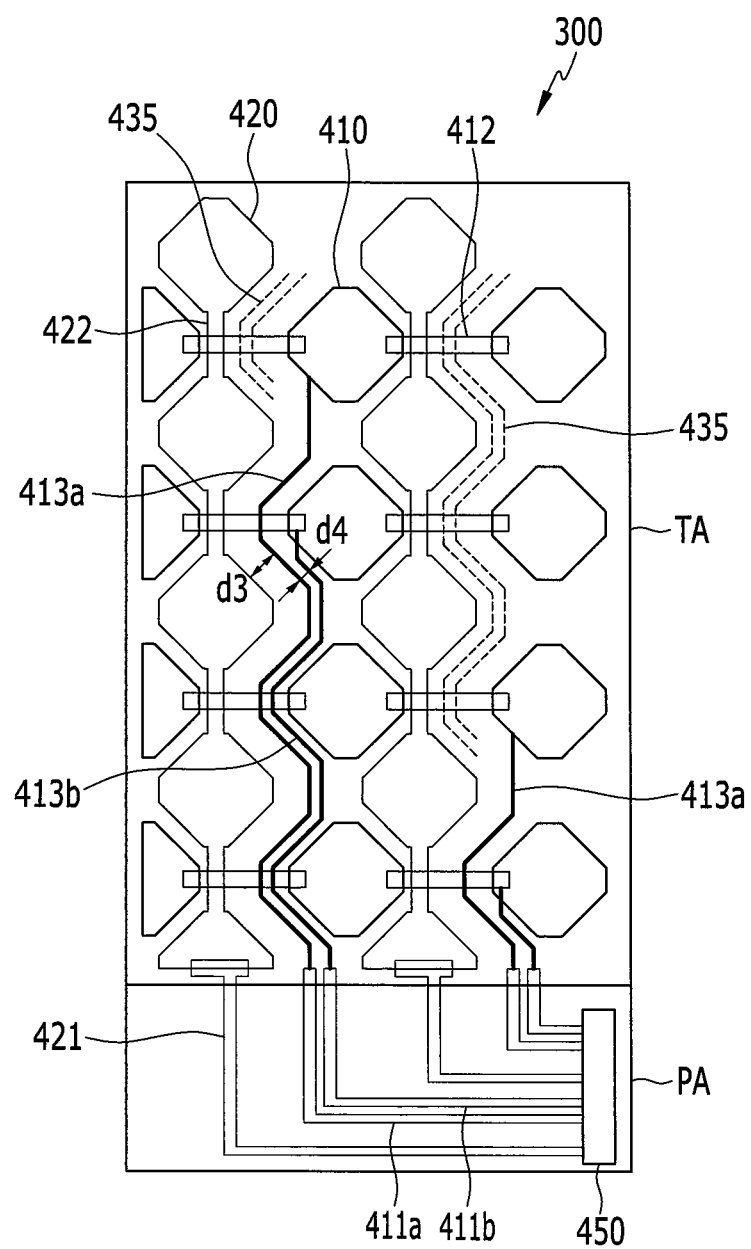

Referring to the embodiment illustrated in FIG. 11, the touch sensing panel 300 corresponds to the touch sensing panel 300 according to the embodiment shown in FIG. 10, with a distance d3 between adjacent second touch electrodes 420 and first connecting wires 413a being different from a distance d4 between adjacent first touch electrodes 410 and second connecting wires 413b. In this embodiment, when the distance d3 between the adjacent second touch electrode 420 and the first connecting wire 413a is increased to be greater than the distance d4 between the adjacent first touch electrode 410 and the second connecting wire 413b, an influence applicable to the adjacent second touch electrode 420 by the first connecting wire 413a transmitting the sense input signal or the sense output signal may be reduced such that accuracy of contact information may be increased.

The distance d3 between the adjacent second touch electrode 420 and the first connecting wire 413a may be equal to or greater than the distance between the adjacent first touch electrode 410 and the second touch electrode 420 without the first and second connecting wires 413a and 413b therebetween.

Figure 12:
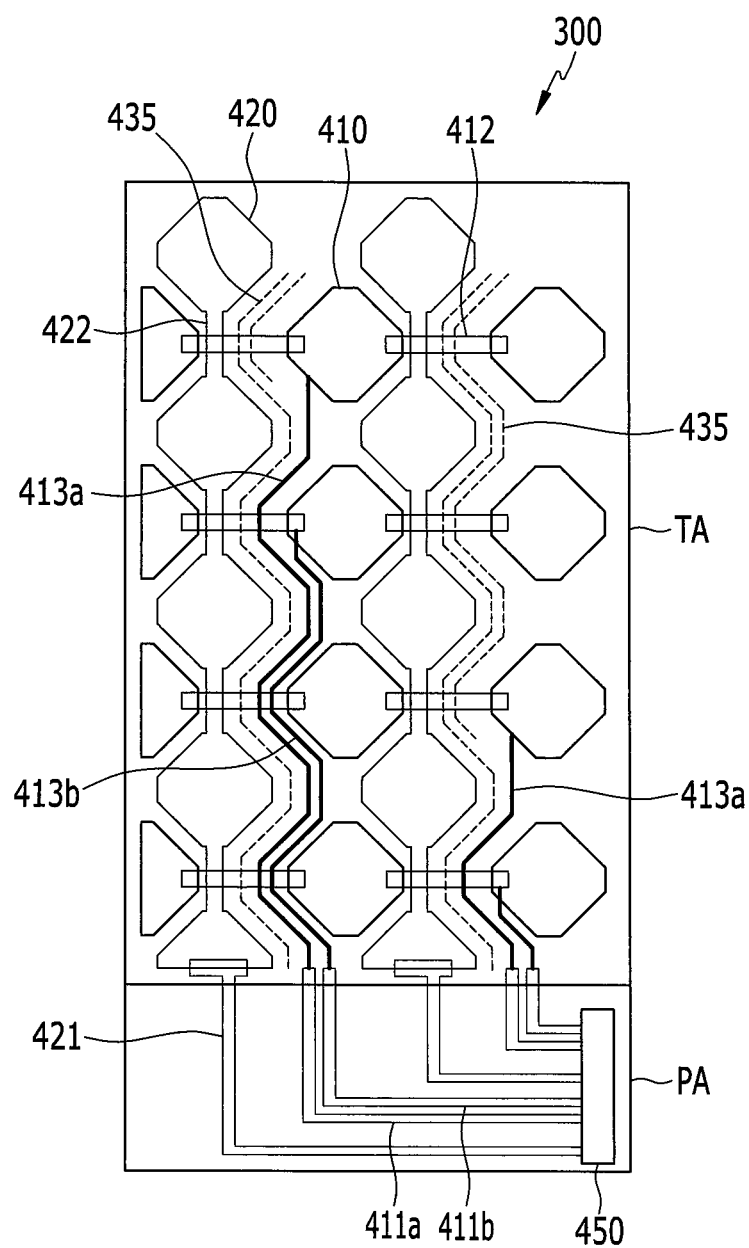

Referring to the embodiment illustrated in FIG. 12, the touch sensing panel 300 according to an embodiment of the present invention corresponds to the touch sensing panel 300 according to the embodiment shown in FIG. 11, with at least a part of the dummy pattern 435 extending between the first connecting wire 413a and the adjacent second touch electrode 420. In touch sensing panels, when the distance between adjacent second touch electrodes 420 and first connecting wires 413a is increased similarly to that described above with regards to FIG. 11, the space therebetween may be visible by the observer, however, when the dummy pattern 435 is in the space between the second touch electrode 420 and the first connecting wire 413a according to this embodiment, easy visibility of this density difference of the pattern induced by a user or observer's position may be prevented or reduced.

While this invention has been described in connection with one or more embodiments with reference to the figures, it is to be understood by those of ordinary skill in the art that the invention is not limited to the disclosed embodiments, and is intended to cover various modifications and equivalent arrangements included within the spirit and scope of the present invention as defined by the appended claims and equivalent thereof.

What is claimed is:

1. A touch sensing panel comprising:
   a plurality of first touch electrodes and a plurality of second touch electrodes in a touch sensing area to sense a touch, the plurality of first touch electrodes and the plurality of second touch electrodes being separated from each other;
   a plurality of first connectors coupling the first touch electrodes arranged along a first direction;
   a plurality of second connectors coupling the second touch electrodes arranged along a second direction that is different from the first direction;
   a first connecting wire between a second touch electrode of the second touch electrodes and a first touch electrode of the first touch electrodes that are adjacent to each other, the first connecting wire being coupled to the first touch electrode or a corresponding first connector; and
   a shield pattern adjacent to the first connecting wire and extending along the first connecting wire,
   wherein the shield pattern adjacent to the first connecting wire is closer to the first connecting wire than to the first touch electrode.

2. The touch sensing panel of claim 1, wherein the shield pattern is between the second touch electrode and the first connecting wire.

3. The touch sensing panel of claim 2, wherein the shield pattern is substantially parallel to the first connecting wire.

4. The touch sensing panel of claim 3, wherein the shield pattern is at a same layer as at least one of the first touch electrode and the second touch electrodes.

5. The touch sensing panel of claim 4, wherein the shield pattern is configured to transmit a constant voltage.

6. The touch sensing panel of claim 5, further comprising a shield driving wire in a peripheral area of the touch sensing area and coupled to the shield pattern.

* * * * *